United States Patent
Fulghum

(10) Patent No.: US 10,692,473 B1
(45) Date of Patent: Jun. 23, 2020

(54) DISPLAY PIXEL CORRECTION USING COMPRESSION

(71) Applicant: Facebook Technologies, LLC, Menlo Park, CA (US)

(72) Inventor: Matthew Robert Fulghum, Palo Alto, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/920,355

(22) Filed: Mar. 13, 2018

(51) Int. Cl.
*G09G 5/10* (2006.01)
*G09G 5/395* (2006.01)

(52) U.S. Cl.
CPC .............. *G09G 5/395* (2013.01); *G09G 5/10* (2013.01); *G09G 2320/0626* (2013.01); *G09G 2350/00* (2013.01)

(58) Field of Classification Search
CPC ......... G06T 11/001; G06T 15/04; G06T 7/40; G06T 7/44; G09G 5/10; G09G 2320/0626; G09G 2320/0233; H04N 1/6027; H04N 1/6041; G06K 9/38
See application file for complete search history.

(56) References Cited

U.S. PATENT DOCUMENTS

| | | | |
|---|---|---|---|
| 2014/0210841 A1* | 7/2014 | Song | G09G 3/34 345/589 |
| 2015/0154789 A1* | 6/2015 | Norberg | G06T 9/00 345/419 |

\* cited by examiner

*Primary Examiner* — Antonio A Caschera
(74) *Attorney, Agent, or Firm* — Fenwick & West LLP

(57) ABSTRACT

Channel selection, quantization, and compression are used to reduce data size of textures used in pixel correction. For example, an apparatus such as a head-mounted display may include circuitry that retrieves a compressed texture from the memory, the compressed texture being generated using various compression techniques, and decompresses the compressed texture to determine adjustment quantization values for sub-pixels based on the compressed values. The circuitry determines reconstructed brightness adjustment levels for the sub-pixels based on the adjustment quantization values, and renders an image frame based on the reconstructed brightness adjustment levels. In some embodiments, the apparatus or a separate device generates the compressed texture in a calibration and stores the texture in a memory of the apparatus for use during the pixel correction.

20 Claims, 10 Drawing Sheets

DISPLAY PIXEL CORRECTION USING COMPRESSION

BACKGROUND

The present disclosure generally relates to correcting defects in pixels of electronic displays.

The pixels of electronic displays can display at uneven brightness or luminance. For example, "mura" refers to variations in brightness caused by imperfections in manufacturing processes or material properties of individual sub-pixels the electronic displays. As the pixels of electronic displays shrink in size to support smaller devices and higher resolutions, the likelihood of mura in the electronic displays is increased. To correct for mura or other types of defects related to pixel luminance, correction factors for each pixel can be stored in a memory and used in connection with rendering the image frames for the electronic display. Among other things, if the electronic displays has a large number of pixels, then a large memory is needed to store the correction factors for each of the pixels or sub-pixels, and high bandwidth is needed to transfer the correction factors for processing.

SUMMARY

Embodiments relate to generating and using a compressed texture for pixel correction in electronic displays. Among other things, use of the compressed texture during pixel correction reduces the memory size used in storing the compressed texture and the bandwidth used in processing and transmitting the compressed values in the compressed texture. Some embodiments may include an apparatus, such as a head-mounted display (HMD). The apparatus includes an electronic display including pixels, the pixels including first color sub-pixels. The apparatus further includes a memory storing a compressed texture including compressed values. Each compressed value is generated from adjustment quantization values of adjacent first color sub-pixels of the electronic display. The adjustment quantization values belong to a set of adjustment quantization values derived from brightness adjustment levels for the first color sub-pixels. The apparatus further includes circuitry that retrieves the compressed texture from the memory, decompresses the compressed texture to determine an adjustment quantization value for each of the first color sub-pixels based on the compressed values, determines reconstructed brightness adjustment levels the first color sub-pixels based on the adjustment quantization values for the first color sub-pixels, and renders an image frame based on the reconstructed brightness adjustment levels for the first color sub-pixels to display the image frame on the electronic display.

In some embodiments, the adjacent first color sub-pixels include blocks of first color sub-pixels, and the compressed values of the compressed texture are generated from adjustment quantization values of adjacent first color sub-pixels of the electronic display using a block compression.

Some embodiments include a method for pixel correction in an electronic display. The method may include generating an image of pixels of the electronic display while first color sub-pixels of the pixels emit a first color light, determining brightness adjustment levels for the first color sub-pixels based on the image, determining a set of adjustment quantization values for the first color sub-pixels based on the brightness adjustment levels for the first color sub-pixels. The method may further include generating a texture defining, for each first color sub-pixel, an adjustment quantization value from the set of adjustment quantization values, and generating a compressed texture for correcting the first color sub-pixels of the electronic display by converting adjustment quantization values of adjacent first color sub-pixels in the texture into compressed values. The method may further include storing the compressed texture including the compressed values in a memory.

In some embodiments, the adjacent first color sub-pixels include blocks of first color sub-pixels, and converting the adjustment quantization values of adjacent first color sub-pixels in the texture into the compressed values includes applying a block compression to the adjustment quantization values.

Some embodiments include a system or apparatus for pixel correction. For example, the system includes a camera that generates an image of pixels of an electronic display while first color sub-pixels of the pixels emit a first color light, and circuitry that generates a compressed texture from the image. The circuitry determines brightness adjustment levels for the first color sub-pixels based on the image, and determines a set of adjustment quantization values for the first color sub-pixels based on the brightness adjustment levels for the first color sub-pixels. The circuitry further generates a texture defining, for each first color sub-pixel, an adjustment quantization value from the set of adjustment quantization values, and generates a compressed texture for correcting the first color sub-pixels of the electronic display by converting adjustment quantization values of adjacent first color sub-pixels in the texture into compressed values. The circuitry stores the compressed texture including the compressed values in a memory

The figures depict embodiments of the present disclosure for purposes of illustration only.

DETAILED DESCRIPTION

Embodiments relate to generating and using a compressed texture for pixel correction in electronic displays. Channel selection, pixel value quantization, and compression are used to reduce data size of textures used in pixel correction, thereby reducing the memory size used for storing the compressed texture and the bandwidth used in referencing and transmitting compressed values of the compressed texture during the pixel correction. In some embodiments, the compression is a block compression that converts quantized values associated with each sub-pixel into the compressed values.

System Overview

Figure 1:
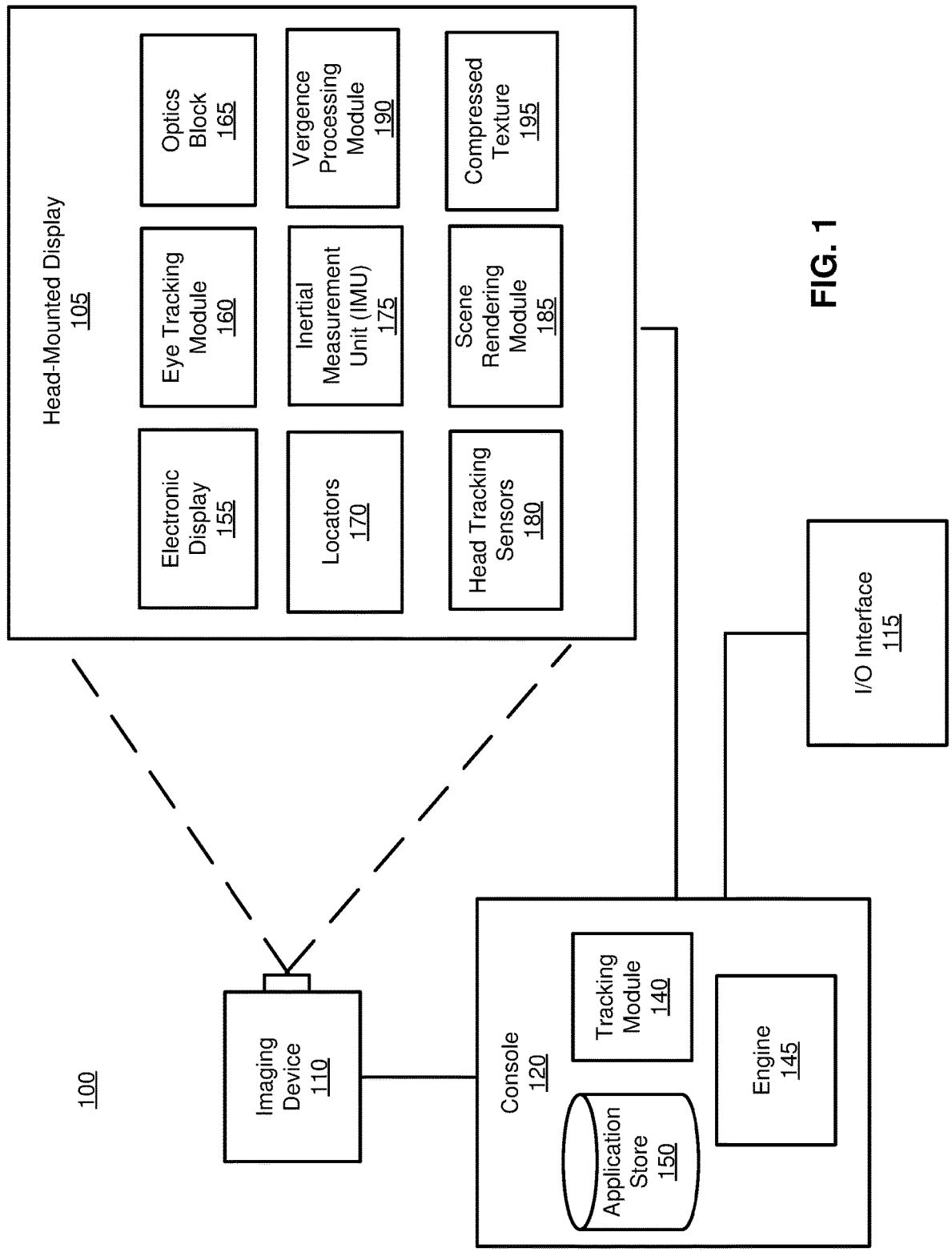
FIG. 1 is a block diagram illustrating a system associated with a head-mounted display (HMD), in accordance with one embodiment.

FIG. 1 is a block diagram illustrating a system 100 including a head-mounted display (HMD), according to one embodiment. The system 100 may be used in a virtual reality (VR) system, an augmented reality (AR) system, a mixed reality (MR) system, or some combination thereof. In this example, the system 100 includes a HMD 105, an imaging device 110, and an input/output (I/O) interface 115, which are each coupled to a console 120. While FIG. 1 shows a single HMD 105, a single imaging device 110, and an I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. A MR and/or AR HMD augments views of a physical, real-world environment with computer-generated elements (e.g., images, video, sound, etc.).

The HMD 105 presents content to a user. Example content includes images, video, audio, or some combination thereof. Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 170, an internal measurement unit (IMU) 175, head tracking sensors 180, and a scene rendering module 185, a vergence processing module 190, and a compressed texture 195.

As discussed in further detail below, the scene rendering module 185 or some other circuitry corrects for uneven luminance in the pixels of the electronic display 155 using the compressed texture 195. A texture refers to collection of values for sub-pixels or groups of sub-pixels, such as compressed values for the compressed texture 195, and an association that maps the values to sub-pixels of the electronic display 155. The electronic display 155 may include a display panel with an array of pixels, each formed from different color sub-pixels. For example, a pixel can include a red color, green color, and blue color sub-pixel.

The scene rendering module 185 applies brightness adjustment levels to the pixel values of image fames to be displayed by the sub-pixels of the electronic display 155. The compressed texture 195 stores compressed data from which brightness adjustment levels are reconstructed to perform the pixel correction. In some embodiments, the compressed texture 195 is generated in a calibration process that includes quantization of adjustment values to generate a set of adjustment quantization values, and (e.g., block) compression of the adjustment quantization values of adjacent sub-pixels into compressed values. Additional details regarding creation of the compressed texture are discussed in connection with FIG. 6.

During pixel correction, the scene rendering module 185 decompresses the compressed texture 195 to determine adjustment quantification values for each sub-pixel from the compressed values, and determines reconstructed brightness adjustment levels used for the pixel correction from the adjustment quantification values for each sub-pixel. The quantization and compression used to generate the compressed texture 195 reduces the data size needed to store brightness adjustment levels for the pixels of the electronic display 155.

In some embodiments, the compressed texture 195 provides sub-pixel correction for a subset of sub-pixel in the electronic display 155. To reduce the data size of the compressed texture 195 and bandwidth usage, the sub-pixel correction is not applied to color channels or sub-pixel types where mura or other luminance defects are less visually perceptible by users. For example, a compressed texture 195 can be generated having compressed values for red color and green color sub-pixels, but not for blue color sub-pixels. Blue color sub-pixels can be formed from blue color LEDs that emit light having components in or near ultraviolet frequencies. This causes any luminance defects in the blue color LEDs being less visually perceptible than similar defects in green or red color sub-pixels. By storing information used to correct only a subset of the sub-pixels of the pixels, the data size and associated bandwidth usage during pixel correction of the compressed texture 195 can be further reduced. Additional details regarding use of the compressed texture for pixel correction are discussed in connection with FIG. 7.

The optics block 165 adjusts its focal length responsive to instructions from the console 120. In some embodiments, the optics block 165 includes a multifocal block to adjust a focal length (adjusts optical power) of the optics block 165.

The eye tracking module 160 tracks an eye position and eye movement of a user of the HMD 105. The light detectors of the electronic display 155 (e.g., or elsewhere in the HMD 105) capture image information of a user's eyes, and the eye tracking module 160 uses the captured information to determine eye tracking information such as interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 105 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 175 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from an engine 145 and provides the content for display on the electronic display 155. Additionally, the scene rendering module 185 can adjust the content based on information from the IMU 175, the vergence processing module 190, and the head tracking sensors 180. The scene rendering module 185 determines a portion of the content to be displayed on the electronic display 155 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 125 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the engine 145.

The engine 145 executes applications within the system 100 and receives position information, acceleration information, velocity information, predicted future positions, or some combination thereof for the HMD 105 from the tracking module 140. Based on the received information, the engine 145 determines content to provide to the HMD 105 for presentation to the user, such as a virtual scene, one or more virtual objects to overlay onto a real world scene, etc.

In some embodiments, the engine 145 performs luminance correction for pixels of the electronic display 155. For example, the engine 145 uses the compressed texture 195 determine the reconstructed brightness adjustment levels for the sub-pixels, and renders an image frame having pixel values determined based on the reconstructed brightness adjustment levels. Here, the compressed texture 195 may be stored in the console 120. In other embodiments, the engine 145 provides the image frame to the scene rendering module 185 or other circuitry of the HMD 105, and the HMD 105 performs the correction by applying reconstructed brightness adjustment levels to the pixel values of the image frame.

In some embodiments, the engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The engine 145 generates instructions for the optics block 165, the instructions causing the optics block 165 to adjust its focal distance to a particular location. The engine 145 generates the instructions based on focal capability information and, e.g., information from the vergence processing module 190, the IMU 175, and the head tracking sensors 180. The engine 145 uses the information from the vergence processing module 190, the IMU 175, and the head tracking sensors 180, or some combination thereof, to select an ideal focal plane to present content to the user. The engine 145 then uses the focal capability information to select a focal plane that is closest to the ideal focal plane. The engine 145 uses the focal information to determine settings for one or more SHWPs, one or more active liquid crystal lenses, or some combination thereof, within the optics block 176 that are associated with the selected focal plane. The engine 145 generates instructions based on the determined settings, and provides the instructions to the optics block 165.

The engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2:
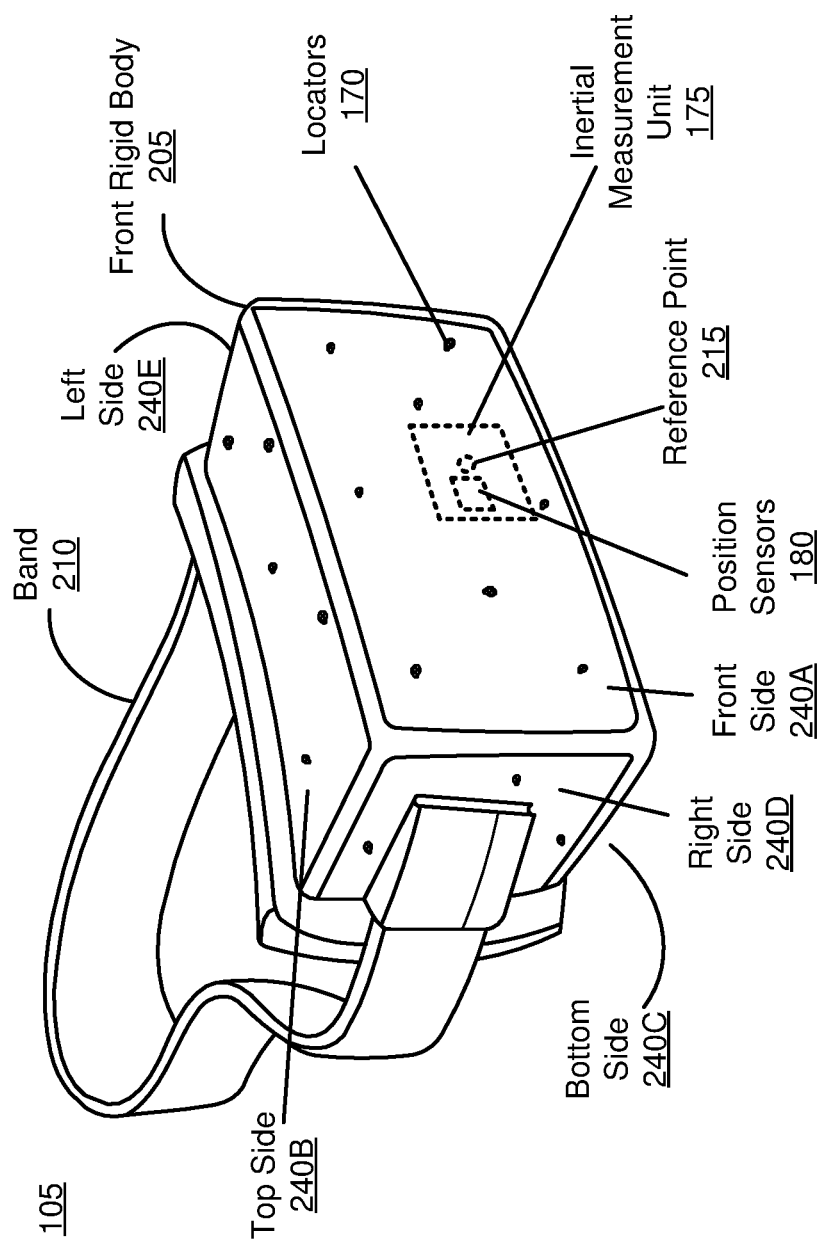
FIG. 2 is a perspective view of the HMD of FIG. 1, in accordance with one embodiment.

FIG. 2 shows a head-mounted display (HMD) 105, in accordance with one embodiment. The HMD 105 includes a front rigid body 205 and a band 210. The front rigid body 205 includes an electronic display (not shown), an inertial measurement unit (IMU) 175, one or more position sensors 180, and locators 170. In some embodiments, a user movement is detected by use of the inertial measurement unit 175, position sensors 180, and/or the locators 170, and an image is presented to a user through the electronic display according to the user movement detected. In some embodiments, the HMD 105 can be used for presenting a virtual reality, an augmented reality, or a mixed reality to a user.

A position sensor 180 generates one or more measurement signals in response to motion of the HMD 105. Examples of position sensors 180 include: one or more accelerometers, one or more gyroscopes, one or more magnetometers, another suitable type of sensor that detects motion, a type of sensor used for error correction of the IMU 175, or some combination thereof. The position sensors 180 may be located external to the IMU 175, internal to the IMU 175, or some combination thereof. In FIG. 2, the position sensors 180 are located within the IMU 175, and neither the IMU 175 nor the position sensors 180 are visible to the user.

Based on the one or more measurement signals from one or more position sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 100 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 17 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 170 are located in fixed positions on the front rigid body 205 relative to one another and relative to a reference point 215. In FIG. 2, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2.

Figure 3:
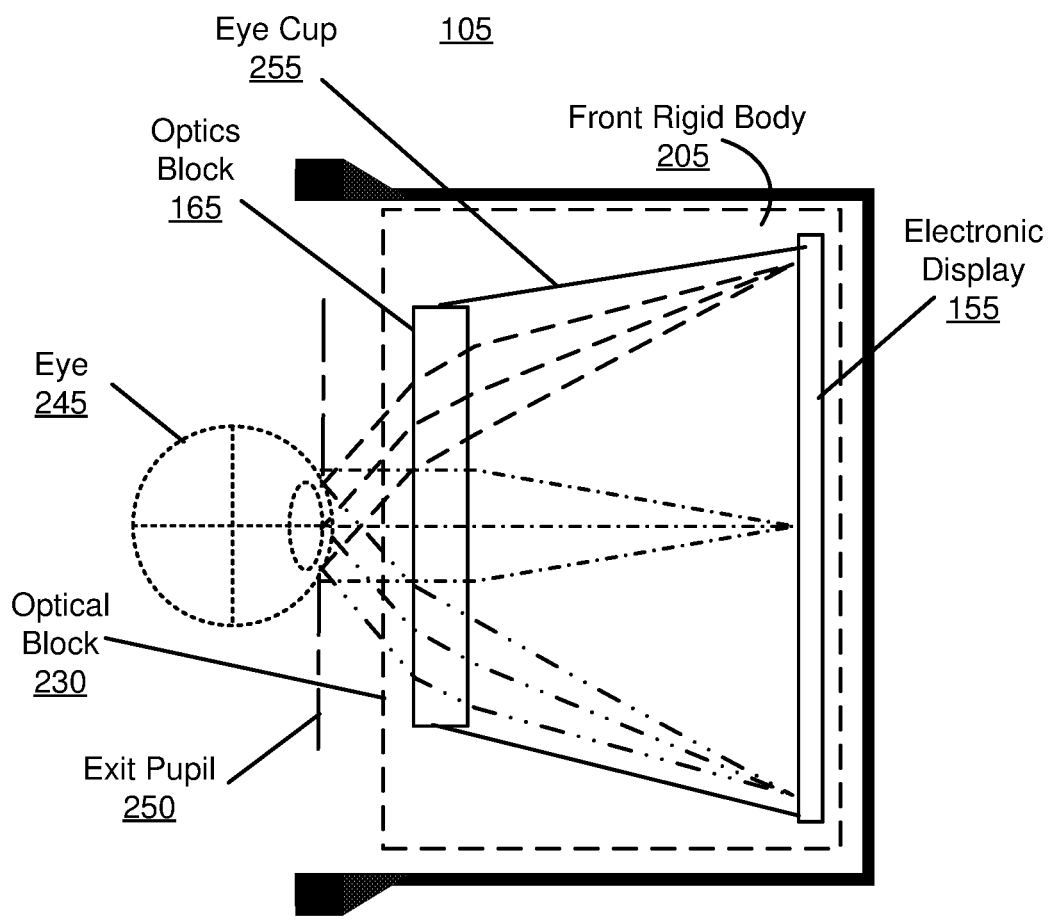
FIG. 3 is a cross sectional diagram illustrating a front rigid body of the HMD in FIG. 2, in accordance with one embodiment.

FIG. 3 is a cross sectional diagram illustrating the front rigid body 205 of the HMD 105 shown in FIG. 2. The front rigid body 205 includes an optical block 230 that provides altered image light to an exit pupil 250. The exit pupil 250 is the location in the front rigid body 205 where a user's eye 245 is positioned. For purposes of illustration, FIG. 3 shows a cross section associated with a single eye 245, but the HMD 105 may include another optical block that provides altered image light to another eye of the user.

The optical block 230 may include, among other components, the electronic display 155, the optics block 165, and an eye cup 255. The eye cup 255 is mechanically secured with the front rigid body 205, and holds the optics block 165. The electronic display 155 emits light toward the optics block 165. The optics block 165 is a combination of components for directing the light to the exit pupil 250 for presentation to the user. The optics block 165 can magnify the light, and in some embodiments, also corrects for one or more additional optical errors (e.g., distortion, astigmatism, etc.). In some embodiments, the optics block 165 and the eye cup 255 may be omitted from the optical block 230. In some embodiments, one or more optical components of the optics block 165 may include an anti-reflection coating.

Figure 4:
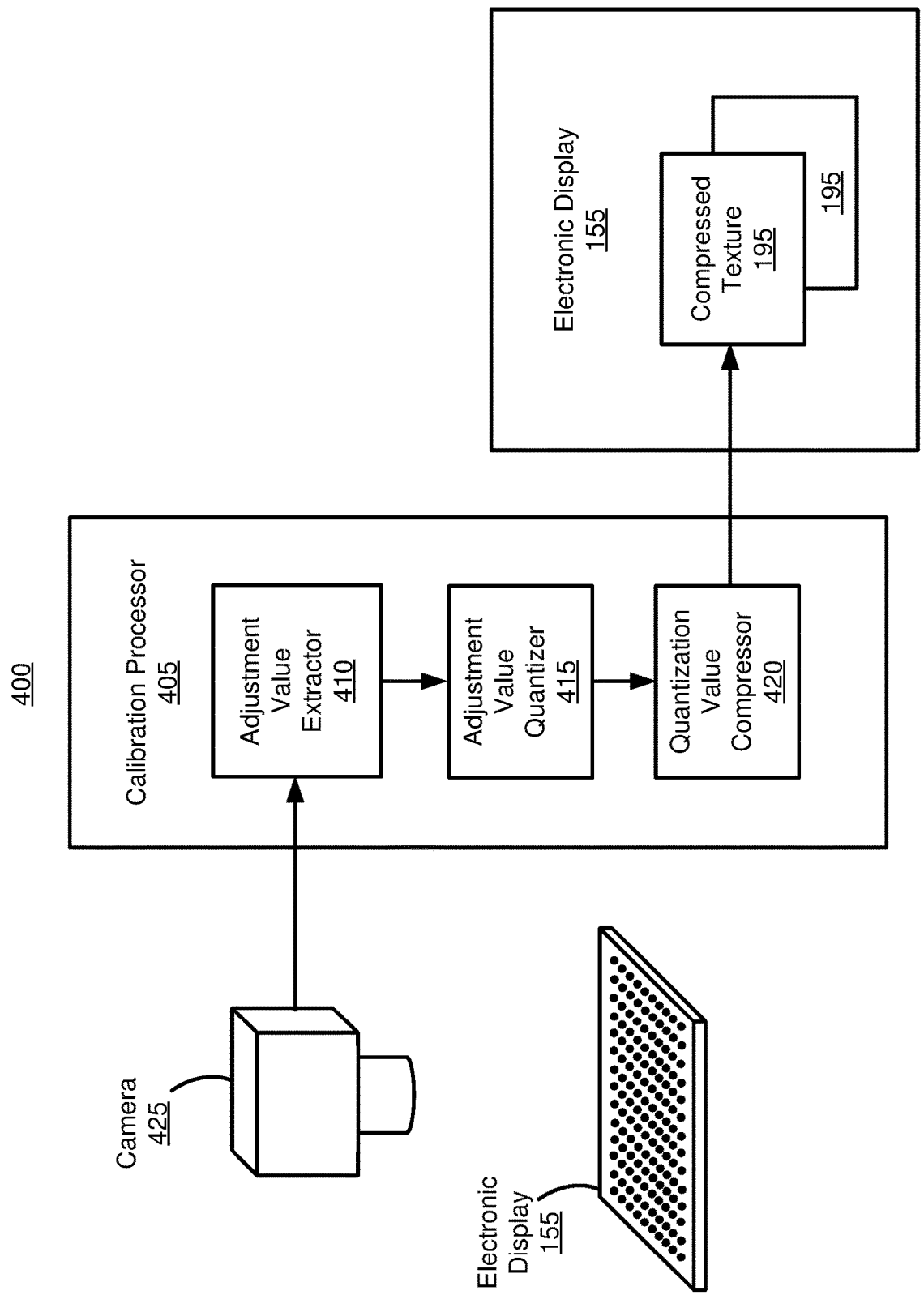
FIG. 4 is a block diagram illustrating a calibration system for an electronic display, in accordance with one embodiment.

FIG. 4 is a block diagram illustrating a calibration system 400, in accordance with one embodiment. The calibration system 400 generates one or more compressed textures 195 for the correcting pixel luminance in the electronic display 155 of the HMD 105, or some other electronic display. In some embodiments, the calibration system 400 generates the compressed texture 195 for the electronic display 155 subsequent to manufacturing of the electronic display 155 to correct luminance defects caused by imperfections in the manufacturing process or materials.

The calibration system 400 includes a calibration processor 405, a camera 425, and the HMD 105. The calibration processor 405 receives an image of the electronic display 155 captured by the camera 425, and processes the image to generate one or more compressed textures 195. The compressed texture 195 may be stored in a memory of the electronic display 155 (or an HMD 105 including the electronic display 155) to facilitate pixel correction. In some embodiments, the calibration processor 405 is in the HMD 105 with the electronic display 155. In other embodiments, the calibration processor 405 is a separate computing device that generates the compressed texture 195 for calibration of the electronic display 155 in a post-manufacturing process step. Among other things, the calibration can correct for luminance defects introduced in the manufacturing of the electronic display 155.

The calibration processor 405 includes an adjustment value extractor 410, an adjustment value quantizer 415, and a quantization value compressor 420. The camera 425 is coupled to the adjustment value extractor 410. Camera 425 generates images of the sub-pixels of the electronic display 155 while the sub-pixels are emitting light. The adjustment value extractor 410 determines brightness adjustment levels for each sub-pixel from the image captured by the camera 425. The brightness adjustment level of a sub-pixel represents a brightness correction value that can be applied to the sub-pixel to achieve an even illumination across the sub-pixels.

The adjustment value quantizer 415 receives the brightness adjustment levels from the adjustment value extractor 410, and generates a texture for correction of the sub-pixels based on the brightness adjustment levels. Rather than directly storing the measured brightness adjustment levels for each sub-pixel, the texture uses a set of quantized values referred to herein as "adjustment quantization values." The set of adjustment quantization values represents a predefined number of values that fit the measured brightness adjustment levels of the sub-pixels. In some embodiments, each adjustment quantization value is defined by a predefined number of bits. In some embodiments, the adjustment value quantizer 415 determines the set of adjustment quantization values based on a histogram. In some embodiments, the adjustment value quantizer 415 weights the histogram with an error function to determine the set of adjustment quantization values.

The quantization value compressor 420 generates the compressed texture 195 from the texture by performing a compression on the adjustment quantization values of the texture. The quantization value compressor 420 combines adjustment quantization values of adjacent sub-pixels in the texture into a compressed value. Each compressed value represents multiple adjustment quantization values for multiple sub-pixels in a compressed format having reduced data size from the texture generated by the adjustment value quantizer 415. After creation of the compressed texture 195, the quantization value compressor 420 provides the compressed texture 195 to the electronic display 155 for pixel correction.

Figure 5:
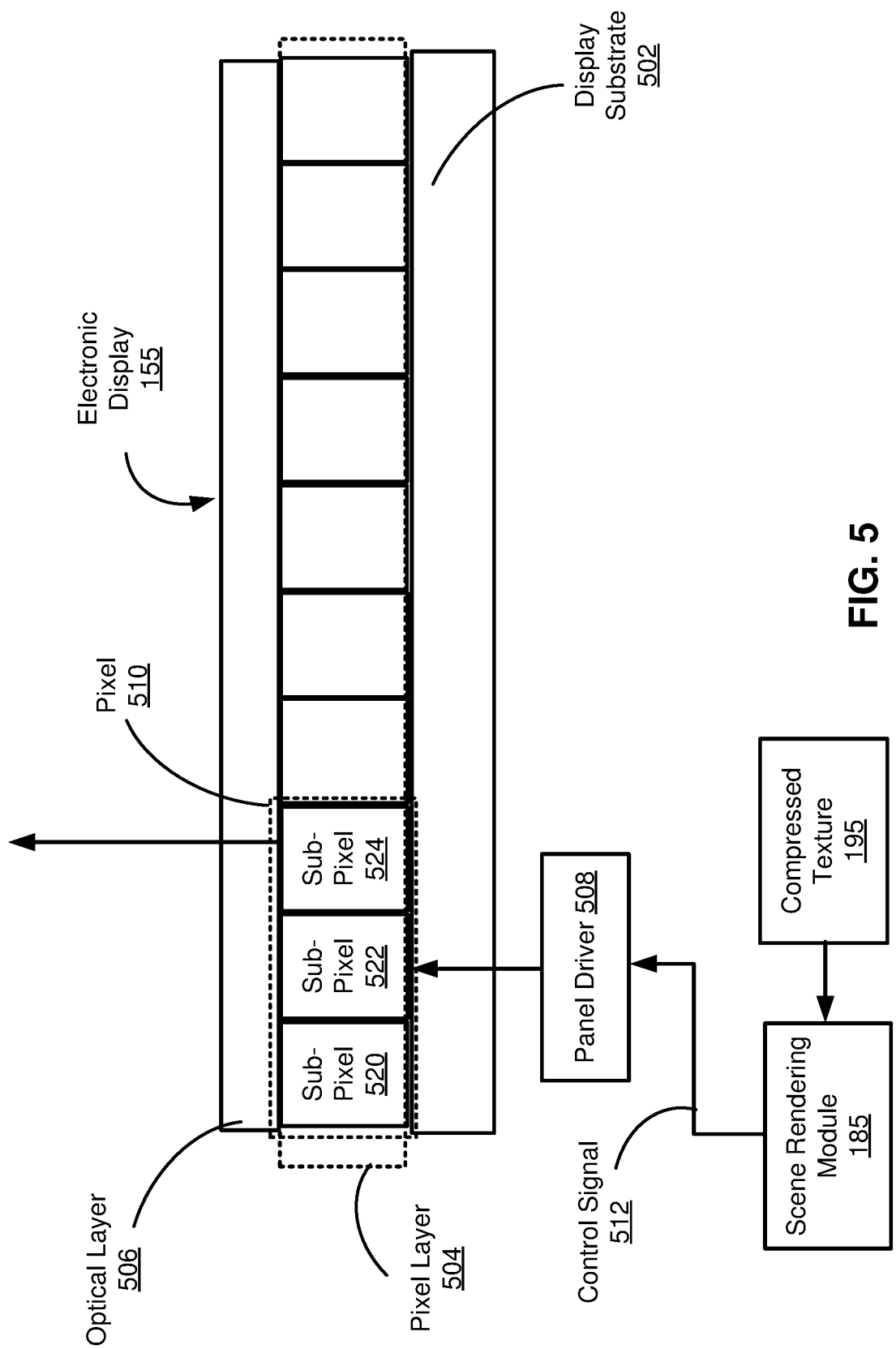
FIG. 5 is a block diagram illustrating of the electronic display in the HMD, in accordance with one embodiment.

FIG. 5 is a block diagram illustrating the electronic display 155 in the HMD 105, in accordance with one embodiment. The electronic display 155 includes a display panel coupled to a panel driver 508. The scene rendering module 185 is coupled to the panel driver 508 to provide a control signal 512 for controlling the pixels 510 of the electronic display 155 via the panel driver 508. The compressed texture 195 is stored in a memory of the HMD 195 and accessed by the scene rendering module 185 to render image frames with pixel correction for display on the electronic display 155. The scene rendering module 185 retrieves the compressed texture 195 from memory, decompresses the compressed texture in the compressed texture format to determine adjustment quantization values for each sub-pixel, and determines reconstructed brightness adjustment levels for the sub-pixels based on the adjustment quantization values to render image frames for display on the electronic display 155. In some embodiments, the scene rendering module 185 includes the calibration processor 405 or similar components to perform the decompression of the compressed texture, and reconstruction of brightness adjustment levels from the adjustment quantization values derived in the decompression. The scene rendering module 185 renders the image frame by adjusting the pixel values of the image frame based on the reconstructed brightness adjustment levels. The adjustment results in improved brightness uniformity across the sub-pixels.

The electronic display 155 includes, among other components, a display substrate 502 (or "substrate 502"), a pixel layer 504, and an optical layer 506. The pixel layer 504 includes an array of pixels 510 that are positioned on the display substrate 502. The pixels 510 of the pixel layer 504 emit light to provide image frames to the viewer. The display substrate 502 provides structural support for various components (e.g., pixels and data/gate lines). The display substrate 502 may also provide electrical connections between the sub-pixel of the pixels 510 and the panel driver 508. The display substrate 502 may be flexible substrate such as polymer or a rigid substrate such as a Thin Film Transistor (TFT) glass substrate.

The pixel layer 504 includes, among other components, the sub-pixels that form the pixels 510. For example, a pixel 410 may include sub-pixels 520, 522, and 524 representing red, green, and blue color sub-pixels. The sub-pixel are positioned on the display substrate 502 adjacent to each other to form a matrix of pixels 510. Each sub-pixel 420 through 424 of each pixel 510 may emit different color light.

In some embodiments, the sub-pixels 420 through 424 of each pixel 510 are each formed from a "μLED," or "Micro-LED," which is a particular type of light emitting diode (LED) having a small active light emitting area (e.g., less than 2,000 $\mu m^2$), and collimated light output. The sub-pixel of the pixel layer 504 may be fabricated separately and then bonded to the display substrate 502. For example, micro-LEDs may be fabricated on a native substrate, singulated, and then transferred to the display substrate 502 to form the pixel layer 504. The micro-LEDs may be positioned on the surface of the display substrate 502, and then bonded to form electrical connections with the display substrate 502 (e.g., a TFT layer). The pixel correction discussed herein can be applied to micro-LEDs because their small size and assembly processes can increase the occurrence of luminance defects such as mura. In other embodiments, the pixel correction is applied to other types of electronic displays, including those with other types of light emitting structures such as organic light emitting diode (OLED), liquid crystal display (LCD), or inorganic light emitting diode (ILED).

The optical layer 506 may be disposed on top of the pixel layer 504. The optical layer 506 may include one or more optical elements that transmit color light emitted from the pixels 510. The optical layer 506 may include brightness enhancement films (BEFs), diffusers, polarizers, etc. The optical layer 506 can change characteristics of the light passed through the optical layer 506, such as polarization orientation, efficiency of light extraction from the display panel, etc. The optical layer 506 may also provide structural protection for the components of the pixel layer 504. In some embodiments, the optical layer 506 is omitted from the electronic display 155.

Pixel Correction Using Compressed Texture

Figure 6:
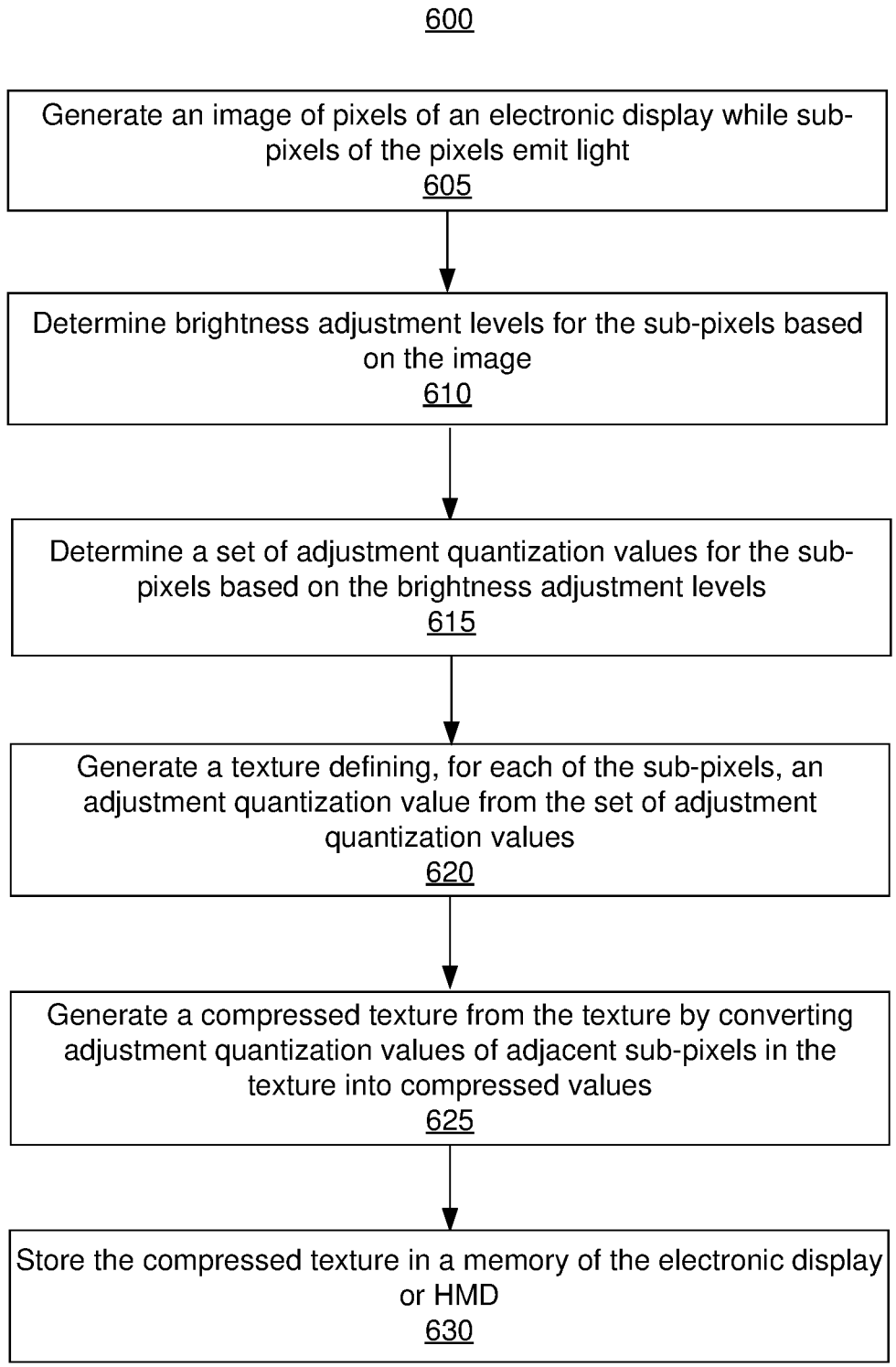
FIG. 6 is a flow chart illustrating a process for generating a compressed texture for pixel correction in an electronic display, in accordance with one embodiment.

FIG. 6 is a flow chart of a process 600 for generating a compressed texture, in accordance with one embodiment. The compressed texture is generated for correcting sub-pixels of the electronic display 155, and has reduced data size resulting from quantization and compression. In some embodiments, the steps of the process 600 are performed by components of the calibration system 400. The steps may be performed in different orders, and the process 600 may include different, additional, or fewer steps.

The camera 425 generates 605 an image of pixels of an electronic display while sub-pixels of the pixels emit light. The image of the pixels is used to extract characteristics of the display such as occurrence of mura. The sub-pixels captured in the image may be color sub-pixels of a particular color, such as red color sub-pixels or green color sub-pixels. The image includes an indication of the brightness level of each illuminated sub-pixel.

For example, while some or all of first color (e.g., red) sub-pixels emit first color light, the camera 425 captures an image of the first color sub-pixels. Similarly, one or more images can be generated for each color sub-pixel to receive pixel correction. In another example, different color sub-pixels emitting light may be captured in a single image.

In some embodiments, only a subset of the sub-pixels of the electronic display 155 receive pixel correction. For example, the camera 425 captures one or more images for red color sub-pixels and green color sub-pixels, but not blue color sub-pixels, and provides the images to the adjustment value extractor 410. In another example, blue color sub-pixels are captured by the camera 425 but not further processed by the calibration processor 405. In general, selective sub-pixel correction (e.g., based on color, sub-pixel type, sub-pixel location, etc.) can be used reduce the data size of the compressed texture 195. The camera 425 provides the generated image to the calibration processor 405 for further processing.

The adjustment value extractor 410 of the calibration processor 405 determines 610 brightness adjustment levels for the sub-pixels based on the image. The brightness level of each sub-pixel that is illuminated and captured in the image can vary. As discussed above, the brightness adjustment level of a sub-pixel represents a brightness correction value that is applied to the sub-pixel to achieve an even illumination across the sub-pixels. In some embodiments, the adjustment value extractor 410 includes a high-pass filter to subtract noise and a baseline brightness value from measured brightness values to generate the brightness adjustment levels for each sub-pixel. Various processing techniques may be used to determine the brightness adjustment levels for each of the sub-pixels, such as techniques that directly measure brightness levels from the electronic display 155 rather than the image captured by the camera 425.

In some embodiments, the pixel values for the sub-pixels of the electronic display 155 are defined by a 32 bit floating-point format. For example, the image frames displayed on the electronic display may be defined by a red color channel, a green color channel, a blue color channel, and in some embodiments, an alpha channel. The red color sub-pixels display image data for the red color channel, the green color sub-pixels display image data for the green color channel, and the blue color sub-pixels display image data for the blue color channel. If each of the four RGBA channels are defined by 32 bits per sub-pixel (bpsp), then each pixel is defined by 128 bits (or 128 bits per pixel (bpp)). The brightness adjustment levels may be defined in the same format as the pixel values to support pixel correction processing. Thus, the brightness adjustment levels may also be defined by 32 bits bpsp, resulting in 128 bpp for the four RGBA channels.

If 128 bpp brightness adjustment levels are directly used to perform pixel correction, this can result in a large data structure (e.g., texture) being stored in memory, and high bandwidth use in accessing the data structure from the memory. For example, the data size of a texture can be defined by Equation 1:

$$D = bbp * R \tag{1}$$

where bpp is the bits per pixel and R is number of pixels in the electronic display. For the example of 128 bpp as discussed above, and where the resolution R is 2,000*2,000 pixels, then the data size of the brightness adjustment levels is 64 megabytes (MB).

The bandwidth used to transmit the texture is defined by Equation 2:

$$B = D * Fr \tag{2}$$

where Fr is the frame rate defined by consecutive image frames, each image frame having the data size defined by D.

For the example of 128 bpp as discussed above, and where the resolution R is 2,000*2,000 pixels and the frame rate is 90 frames per second (fps), then the bandwidth needed to transmit each brightness adjustment levels is 5.76 gigabytes per second (GB/S). Furthermore, if the HMD 105 includes two electronic displays 155, then the data size is doubled and the bandwidth needed is also doubled to 11.52 GB/S.

If the blue and alpha channels are not used for pixel correction, then both texture data size and the bandwidth use can be decreased. For example, rather than being 128 bpp for four channels (e.g., 32 bpp per channel), each pixel is defined by 64 bpp for the two red and green color channels. This results in a halving of the data size as defined in Equation 1, in particular to 32 MB, and a halving of the bandwidth as defined by Equation 2, in particular to 2.88 GB/S per display. As discussed in greater detail below, data size and bandwidth use in pixel correction can be further decreased using quantization and compression.

The adjustment value quantizer 415 determines 615 a set of adjustment quantization values for the sub-pixels based on the brightness adjustment levels of the sub-pixels. The set of adjustment quantization values represents a predefined number of values that fit the measured brightness adjustment levels of the sub-pixels. Each adjustment quantization value may be defined by Y bpsp. For example, if Y=8 bpsp is used for each adjustment quantization value, then the set of adjustment quantization values for the sub-pixel can include 256 discrete values defined between 0 and 255.

The adjustment value quantizer 415 determines an adjustment quantization value between 0 and 255 as represented in binary format by 8 bpsp for each of the sub-pixels. In comparison, the brightness levels and brightness adjustment levels for each sub-pixel may be represented by X bpsp, where X is larger than Y. For example, brightness adjustment levels may correspond with pixel values in X=32 bit floating-point format without quantization as discussed above. As such, the use of quantization reduces the size of stored information used to perform pixel correction for each sub-pixel.

Applying the 8 bpsp for two color channels (E.g., red and green) results in 16 bpp for the adjustment quantization value. Applying 16 bpp and the 2,000*2,000 pixel resolution R to Equation 1 results in a data size of 8 MB. This is smaller than the 64 MB data size of brightness adjustment values for four channels, and also smaller than the 32 MB data size for the brightness adjustment values for two color channels without quantization into the adjustment quantization values.

In some embodiments, the adjustment value quantizer 415 determines the set of adjustment quantization values based on a histogram. The adjustment value quantizer 415 generates the histogram by separating the brightness adjustment levels for the sub-pixels in the image into bins, and determines a range of the brightness adjustment levels based on the distribution of the bins in the histogram. Each bin may be defined by a range of brightness adjustment levels, and each sub-pixel is assigned to a bin according to its brightness adjustment level to generate the histogram.

The adjustment value quantizer 415 assigns a range of the brightness adjustment level bins in the histogram to the set of adjustment quantization values with each brightness adjustment level bin in the range of brightness adjustment levels bins being assigned to an adjustment quantization value in the set of adjustment quantization values. The range of brightness adjustment level bins can be selected as subset of all brightness adjustment level bins of the sub-pixels in the histogram, which reduces the number of adjustment quantization values in the set of adjustment quantization values. For example, if the adjustment quantization value is defined by Y=8 bpsp, then the selected range of brightness adjustment level bins are assigned to adjustment quantization values between 0 and 255 as defined by the 8 bits in binary format. Using a naïve quantization that does not weight the histogram results in 6.5 bpsp effective, and similar decreases to data size and bandwidth as respectively defined in Equations 1 and 2.

Figure 8:
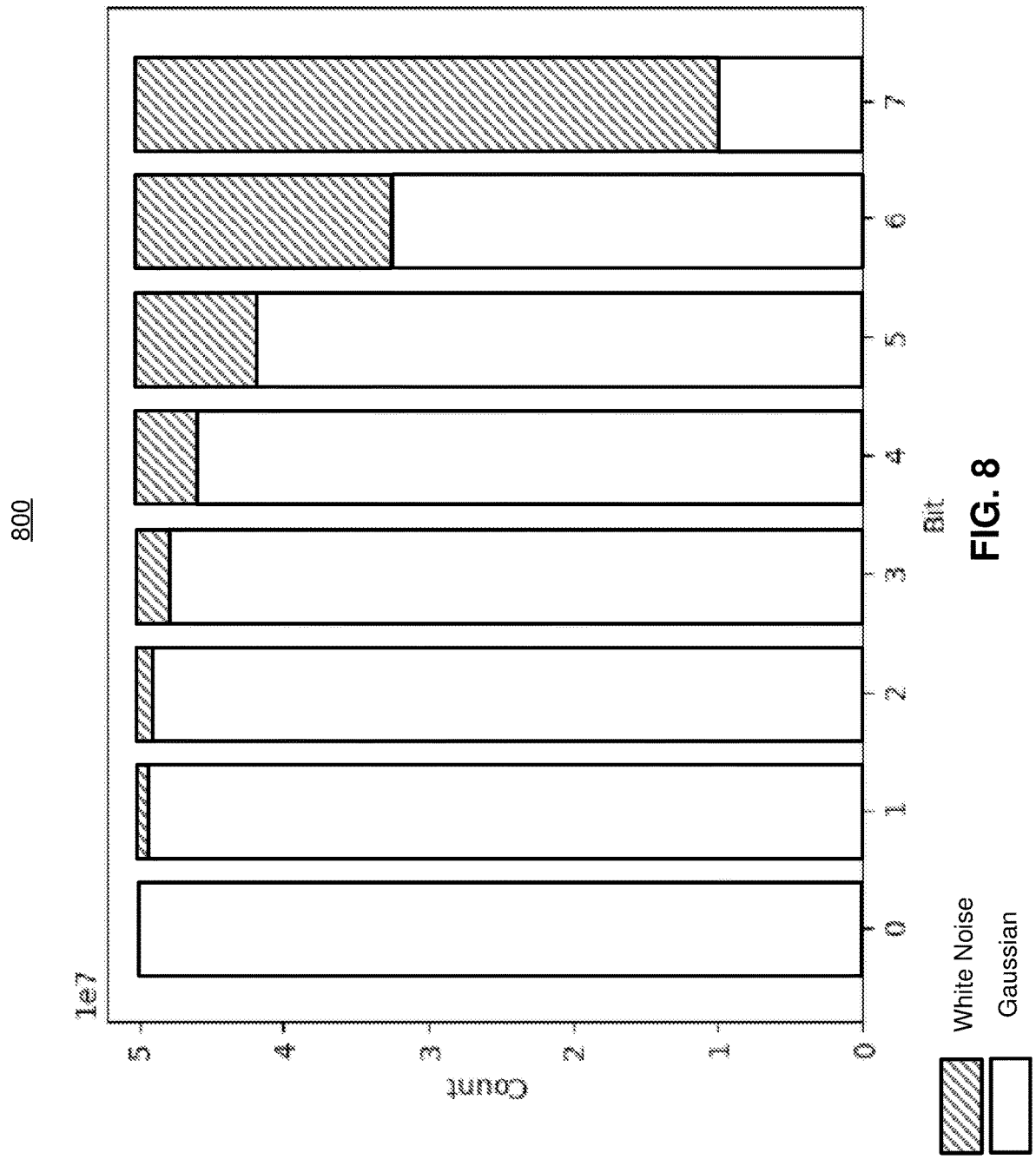
FIG. 8 shows an example graph of brightness adjustment levels assigned to adjustment quantization values, in accordance with one embodiment.

FIG. 8 shows an example of a graph 800 of brightness adjustment levels assigned to adjustment quantization values, in accordance with one embodiment. In particular, the graph 800 shows how often a bit is set in an 8-bit quantization of the absolute value of a 100 million point Gaussian of brightness adjustment levels clipped at 99.9th percentile. The brightness adjustment levels may be nominally Gaussian distributed, so a Gaussian provides a good approximation. The sum of the bars from this chart, normalized by 100 million counts/2, gives an effective number of bits (ENOB) of 6.52 bpsp. White noise is uniformly distributed into each bit bucket to result in an ENOB of 8 bpsb. In this case, "effective" bits refer to how many bits are actually carrying information. Increasing the ENOB of data during quantization and before compression improves the accuracy of the compressed texture by minimizing the loss of information.

Figure 9:
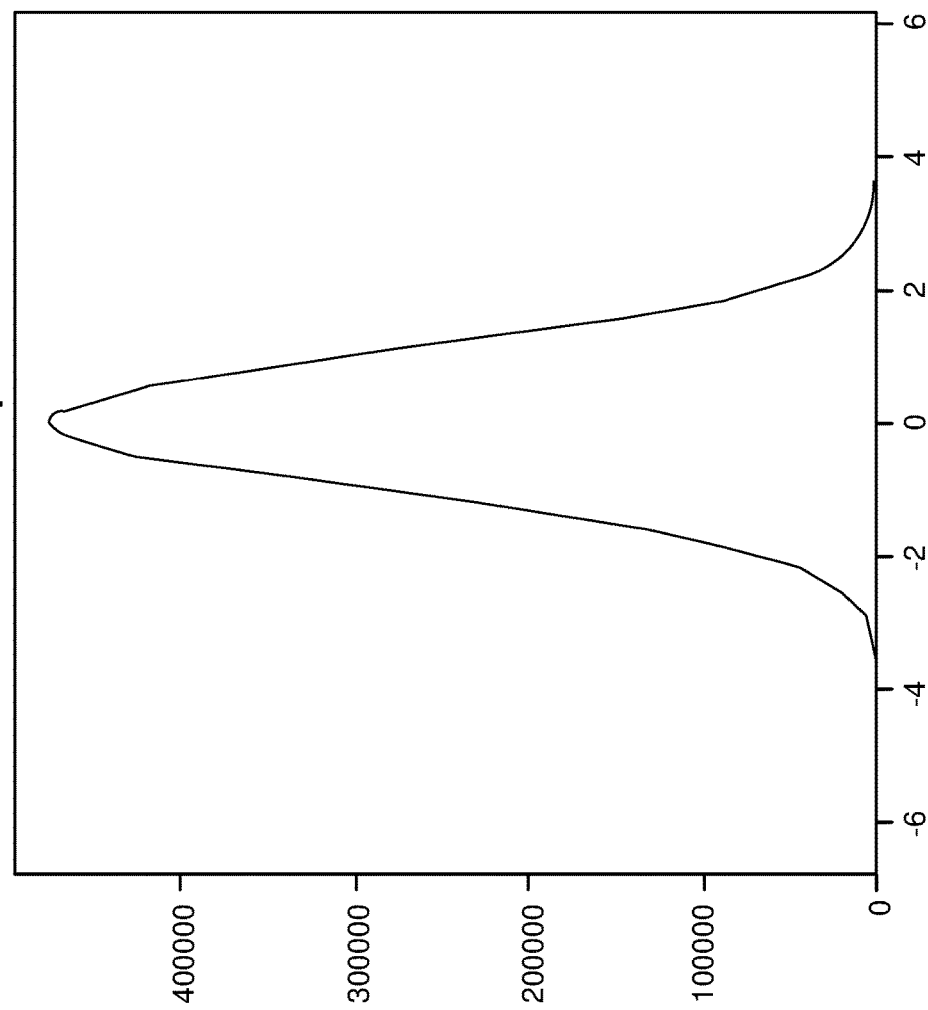
FIG. 9 shows an example of a Gaussian distribution of brightness adjustment levels, in accordance with embodiment.
Figure 10:
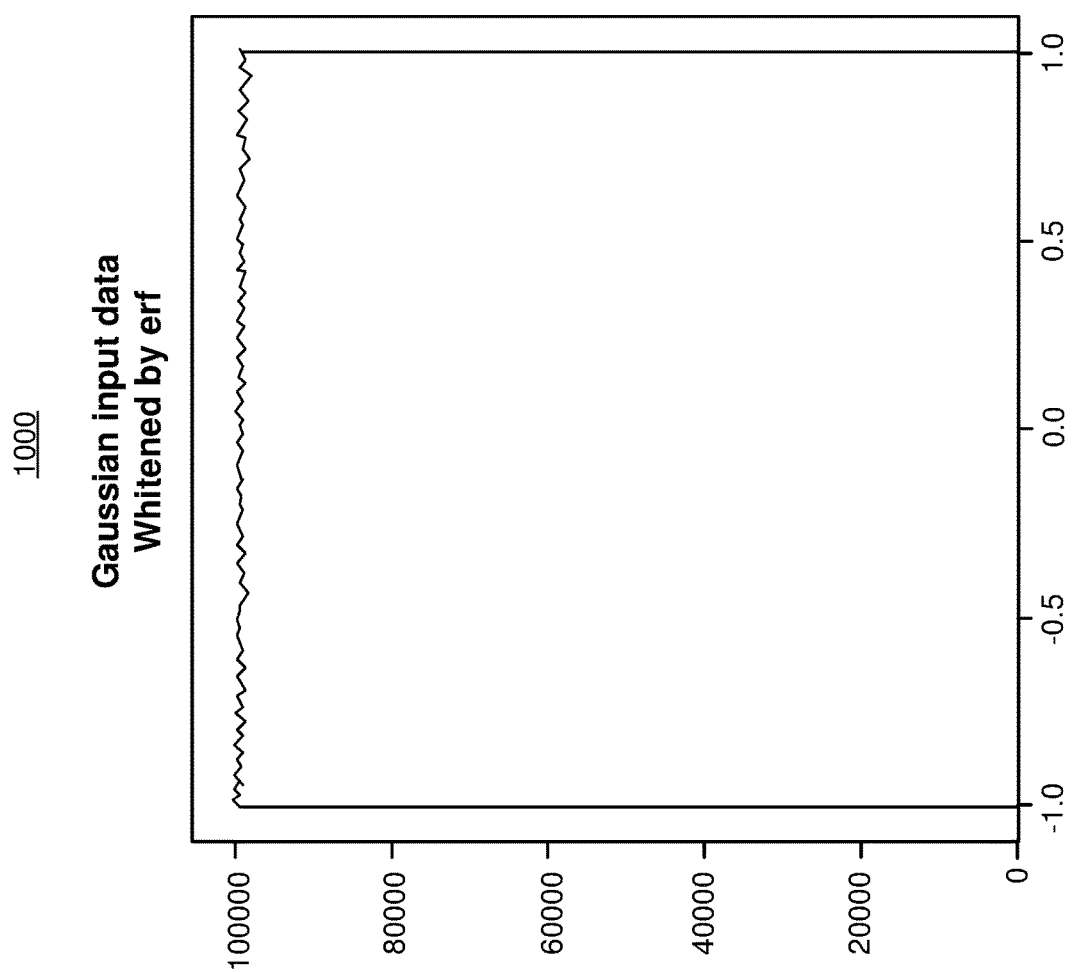
FIG. 10 shows an example of brightness adjustment levels weighted by the error function, in accordance with one embodiment.

In some embodiments, the adjustment value quantizer 415 weights the histogram with the error function to generate the set of adjustment quantization values. FIG. 9 shows an example of a Gaussian distribution 900 of brightness adjustment levels, in accordance with embodiment. The error function is the cumulative distribution function of the Gaussian distribution 1000, so erf [x/(sigma*sqrt(2))] flattens the histogram of the data, "whitening" it as seen in FIG. 10, which shows an example of brightness adjustment levels generated from the Gaussian distribution 900, in accordance with one embodiment. In some embodiments, the error function is modified to minimize the occurrence of anomalies. An anomaly that could occur with a direct erf weighting is that it doesn't clamp off extreme outlier data, so there might be unwanted high levels of correction that would be hard to check for in automated testing. Clipping off 0 and 255 values from the output (setting them to 128 instead) seems to effectively deter many of these anomalies. An alternative scaling factor for the erf like 1.5, i.e. erf [x/(sigma*1.5)], can also help reduce the influence of these outliers at a small cost to ENOB (7.87 bits/subpixel vs. 8 bits/subpixel). The adjustment value quantizer 415 generates 620 a texture defining, for each of the sub-pixels, an adjustment quantization value from the set of adjustment quantization values. The texture defines an adjustment quantization value for each of the sub-pixels that can be used to correct luminance defects in the sub-pixels. The adjustment value quantizer 415 assigns each sub-pixel to an adjustment quantization value based on the brightness adjustment level, and the relationship between brightness adjustment levels and adjustment quantization values. As discussed above, each adjustment quantization value may be defined by a predefined number of bits per sub-pixel, such as 8 bpsp to provide 256 distinct adjustment quantization values as represented in binary by the 8 bits. The texture has correspondingly reduced data size and bandwidth requirements resulting from the quantization.

The quantization value compressor 420 of the calibration processor 405 generates 625 a compressed texture from the texture by converting adjustment quantization values of adjacent sub-pixels in the texture into compressed values. The quantization value compressor 420 combines adjustment quantization values of adjacent sub-pixels in the texture into the compressed value. The groups of adjacent sub-pixels may defined a block, and the compressed texture includes a compressed value for each block. Each compressed value represents multiple adjustment quantization values for multiple sub-pixels. By combining adjustment quantization values from multiple sub-pixels into the compression format rather, the compressed texture 195 has reduced data size and bandwidth needs from the texture generated by the adjustment value quantizer 415.

For example, using blocks of 4×4 sub-pixels results in a 16× effective resolution R and assuming same bpsp for the compressed value as an adjustment quantization, the data size defined by Equation 1 and the bandwidth defined by Equation 2 are further reduced 16 times from the compression.

In some embodiments, the quantization value compressor 420 may include a block compressor. The block compressor may be a graphics processing unit (GPU) or an application specific integrated circuit (ASIC) that applies the block compression to the adjustment quantization values in the texture. The block compressor generates the compressed texture 195 by grouping adjacent sub-pixels in the texture into blocks of M×N (e.g., 4×4) sub-pixels, and generating the compressed value for each block. Furthermore, the block compression may include adjustable bits per block. In some embodiments, a block in the compressed texture represents a full pixel, not a subpixel, resulting in an effective compression from a standard 32-bit (red, green, blue, and alpha [opacity]) texture of about 9×. In some embodiments, the size of the blocks can be varied to provide adjustable levels of compression. Larger block sizes results in more adjustment quantization values of adjacent sub-pixels being combined into a compressed value, and thus smaller data size for the compressed texture. Similarly, smaller block sizes can be used to improve the precision of luminance correction at the cost of larger data size for the compressed texture. Blocks may be square or rectangular in terms of pixel dimensions. Some example block sizes may include 4×4, 4×5, 5×5, 5×6, 12×12, etc. In addition or alternative to block compression, other types of compression techniques and formats may be used to combine the adjustment quantization levels from multiple sub-pixels and reduce data size of the compressed texture 195.

In some embodiments, the compressed values for blocks of the compressed texture are index values that reference data in the compressed format. For example, the compressed values may be defined by a 32 bit index for blocks in a lookup table. The lookup table may be stored in the memory of the HMD 105 or the electronic display 155. The number and types of blocks in the lookup table may be trimmed to include only blocks used in the pixel correction. The quantization value compressor 420 generates the compressed texture from the texture by converting adjustment quantization values of adjacent sub-pixels in the texture into compressed values that reference blocks, where the blocks define a transformation between the adjustment quantization values and the brightness adjustments levels.

In some embodiments, other types of compression can be used to generate the compressed texture from the texture such as spatial pooling. For example, the sub-pixels in each block can be combined by a min, max, or average pooling of adjustment quantization values from sub-pixels in each block. Here, the spatially pooled values are used as the compression values stored in the compressed texture.

The quantization value compressor 420 stores 630 the compressed texture 195 in a memory of the electronic display 155 or the HMD 105. The compressed texture 195 is subsequently retrieved to perform pixel correction for the electronic display 155, as discussed in greater detail below in connection with FIG. 7.

In some embodiments, some or all of the steps of the process 600 are performed for multiple color sub-pixels of the electronic display 155. For example, process 600 may be performed for red color sub-pixels and green color sub-pixels to generate one or more compressed textures 195 defining compressed values for the red and green color sub-pixels. In some embodiments, the process 600 excludes processing for blue color sub-pixels. Luminance defects in blue color sub-pixels may be harder to visually perceive by a user, and thus the data size of the compressed texture 195 can be further reduced by ignoring the blue color sub-pixels. In that sense, the process 600 provides for multiple ways of reducing the volume of stored data used in pixel correction including quantization, compression, and/or selective color channel processing.

Figure 7:
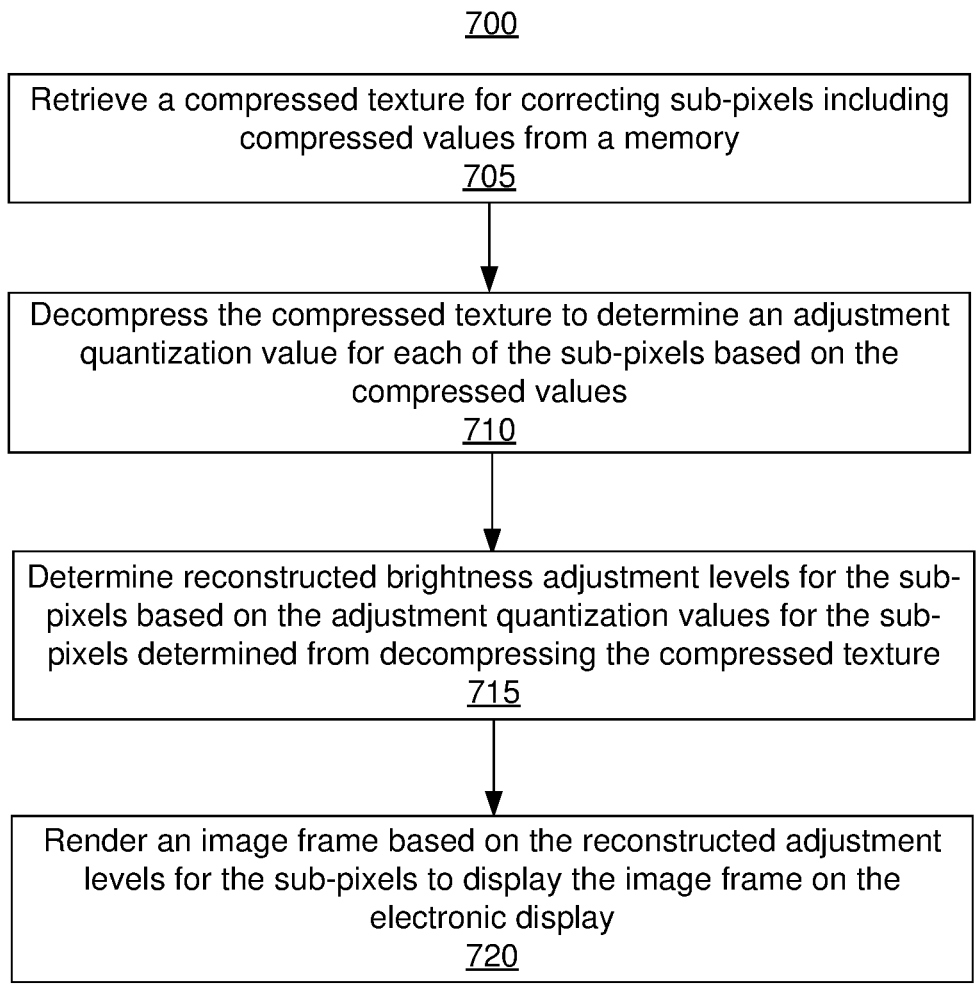
FIG. 7 is a flow chart illustrating a process for pixel correction in an electronic display using a compressed texture, in accordance with one embodiment.

FIG. 7 is a flow chart of a process 700 for pixel correction using a compressed texture, in accordance with one embodiment. The compressed texture is used to correct sub-pixels of the electronic display 155. In some embodiments, the steps of the process 700 are performed by components of the system 100, such as the HMD 105 or the console 120. The steps may be performed in different orders, and the process 700 may include different, additional, or fewer steps.

The scene rendering module 185 retrieves 705 the compressed texture for correcting sub-pixels including compressed values from a memory. The compressed texture may be generated in a calibration for the electronic display 155 as discussed above in the process 600. The scene rendering module 185 can retrieve the compressed texture, or stored compression values of the compressed texture, in connection with a rendering of image frames to modify the pixel values of the image frame using the compressed texture.

The scene rendering module 185 decompresses 710 the compressed texture to determine an adjustment quantization value for each of the sub-pixels based on the compressed values of the compressed texture. As discussed above, the compressed values are generated by combining adjustment quantization values from multiple sub-pixels into a compression format. Here, the decompression transforms the compressed values into the adjustment quantization values.

For example, if block compression was used to generate the compression values, then block decompression can be used to derive the adjustment quantization values. The scene rendering module 185 may a GPU or ASIC (e.g., like the quantization value compressor 420) that performs an algorithmic transformation between compression values and adjustment quantization values.

If a reference transformation is used, then the scene rendering module 195 performs a transformation lookup with the compression value of each block to derive the adjustment quantization values of the sub-pixels in the block. Here, the compressed values of the compressed texture act as indices for referencing the transformation between compression values and adjustment quantization values. These transformations of each block may also be stored in a memory of the HMD 105 or the electronic display 155.

Various other types of compression formats may also be used to combine the adjustment quantization levels from multiple sub-pixels and reduce data size of the compressed texture 195, and corresponding decompression techniques can be applied to these other compression formats.

The scene rendering module 185 determines 715 reconstructed brightness adjustment levels for the sub-pixels based on the adjustment quantization values for the sub-pixels as determined from decompressing the compressed texture. As discussed above, each adjustment quantization value is related to a brightness adjustment level bin. The reconstructed brightness adjustment levels may be derived using this relationship between the adjustment quantization values and the brightness adjustment level bins. Each sub-pixel is associated with a reconstructed brightness adjustment level that corresponds with the brightness adjustment level bin assigned to the sub-pixel in the process 600. In some embodiments, this relationship is stored in the memory of the HMD 105 or the electronic display 155 with the compressed texture. The scene rendering module 185 determines a reconstructed brightness adjustment level for each sub-pixel to receive correction in the electronic display 155.

The scene rendering module 185 renders 720 an image frame based on the reconstructed adjustment levels for the sub-pixels to display the image frame on the electronic display 155. For example, the scene rendering module 185 receives the image frame from the engine 145 of the console 120, or alternatively, generates the image frame. The image frame includes pixel values for each pixel. For a display having pixels formed from individual red, green, and blue color sub-pixels, the image frame includes pixel values for each sub-pixel. The scene rendering module 185 modifies the pixel values for each sub-pixel based on the reconstructed brightness adjustment levels for each sub-pixel. As such, the rendered image frame has pixel values that are calibrated for the luminance defects in the sub-pixels of the electronic display 155. In another example, the scene rendering module 185 changes properties of the control signal 512 to alter the brightness of each sub-pixel based on the reconstructed brightness adjustment levels. For example, the brightness level of a sub-pixel can be changed based on changing the driving current or by changing a duty cycle of the control signal 512 for the sub-pixel. The scene rendering module 185 can render multiple image frames, such as of a video or application output, based on the reconstructed adjustment levels.

The process 700 can be performed for each color channel and associated color sub-pixel to receive pixel correction. In some embodiments, only red and green channels and sub-pixels receive the pixel correction. The image data associated with rendering the The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An apparatus for pixel correction, comprising:
an electronic display including pixels, the pixels including first color sub-pixels;
a memory storing a compressed texture including compressed values, each compressed value being generated from adjustment quantization values of adjacent first color sub-pixels of the electronic display, the adjustment quantization values belonging to a set of adjustment quantization values derived from brightness adjustment levels for the first color sub-pixels; and
circuitry configured to:
  retrieve the compressed texture from the memory;
  decompress the compressed texture to determine an adjustment quantization value for each of the first color sub-pixels based on the compressed values;
  determine reconstructed brightness adjustment levels for the first color sub-pixels based on the adjustment quantization values for the first color sub-pixels; and
  render an image frame based on the reconstructed brightness adjustment levels for the first color sub-pixels to display the image frame on the electronic display.

2. The apparatus of claim 1, wherein the circuitry configured to determine the adjustment quantization value for each of the first color sub-pixels based on the compressed values includes the circuitry being configured to apply a transformation as defined by the compressed values.

3. The apparatus of claim 1, wherein:
the memory further stores a transformation between the adjustment quantization values and the compressed values;
the circuitry configured to determine the adjustment quantization value for each of the first color sub-pixels based on the compressed values includes the circuitry being configured to reference the transformation with the compressed values.

4. The apparatus of claim 1, wherein each brightness adjustment level for each first color sub-pixel is represented by more bits than each adjustment quantization value for each first sub-pixel.

5. The apparatus of claim 1, wherein the circuitry is further configured to:
decompress the compressed texture to determine a second adjustment quantization value for each of the second color sub-pixels based on the compressed values;
determine second reconstructed brightness adjustment levels the second color sub-pixels based on the second adjustment quantization values for the first color sub-pixels; and
render the image frame based on the second reconstructed brightness adjustment levels for the second color sub-pixels.

6. The apparatus of claim 5, wherein:
the first color sub-pixels are red color sub-pixels;
the second color sub-pixels are blue color sub-pixels;
the pixels further include green color sub-pixels; and
the memory excludes a compressed texture for correcting the green color sub-pixels of the electronic display.

7. The apparatus of claim 1, wherein:
the adjacent first color sub-pixels include blocks of first color sub-pixels; and
the compressed values of the compressed texture are generated from adjustment quantization values of adjacent first color sub-pixels of the electronic display using a block compression.

8. A method for pixel correction in an electronic display, comprising:
  generating an image of pixels of the electronic display while first color sub-pixels of the pixels emit a first color light;
  determining brightness adjustment levels for the first color sub-pixels based on the image;
  determining a set of adjustment quantization values for the first color sub-pixels based on fitting the brightness adjustment levels for the first color sub-pixels to a predefined number of values by:
    generating brightness adjustment level bins from the brightness adjustment levels for the first color sub-pixels;
    determining a range of the brightness adjustment level bins; and
    assigning a subset of the brightness adjustment level bins to the set of adjustment quantization values with each brightness adjustment level bin in the range of brightness adjustment level bins being assigned to an adjustment quantization value in the set of adjustment quantization values;
  generating a texture defining, for each first color sub-pixel, an adjustment quantization value from the set of adjustment quantization values;
  generating a compressed texture for correcting the first color sub-pixels of the electronic display by converting adjustment quantization values of adjacent first color sub-pixels in the texture into compressed values; and
  storing the compressed texture including the compressed values in a memory.

9. The method of claim 8, wherein:
  the adjacent first color sub-pixels include blocks of first color sub-pixels; and
  converting the adjustment quantization values of adjacent first color sub-pixels in the texture into the compressed values includes applying a block compression to the adjustment quantization values.

10. The method of claim 9, further adjusting a number of the adjacent first color sub-pixels combined in each of the blocks to adjust data size of the compressed texture.

11. The method of claim 8, further comprising, by a processor of the electronic display or a head-mounted display (HMD) including the electronic display:
  retrieving the compressed texture from the memory, the memory being a memory of the electronic display or the HMD;
  decompressing the compressed texture to determine an adjustment quantization value for each of the first color sub-pixels based on the compressed values;
  determining reconstructed brightness adjustment levels for the first color sub-pixels based on the adjustment quantization values for the first color sub-pixels determined from decompressing the compressed texture; and
  rendering an image frame based on the reconstructed brightness adjustment levels for the first color sub-pixels to display the image frame on the electronic display.

12. The method of claim 11, further comprising storing a transformation between the between the adjustment quantization values and the compressed values in the memory; and wherein determining the adjustment quantization value for each of the first color sub-pixels based on the compressed values includes referencing the transformation with the compressed values.

13. The method of claim 11, wherein determining the adjustment quantization value for each of the first color sub-pixels based on the compressed values includes applying an algorithmic transformation defined by the compressed values.

14. The method of claim 8, wherein each brightness adjustment level for each first color sub-pixel is represented by more bits than each adjustment quantization value for each first sub-pixel.

15. The method of claim 8, wherein determining the set of adjustment quantization values for the first color sub-pixels based on the brightness adjustment levels for the first color sub-pixels includes generating a histogram of the brightness adjustment level bins, and wherein the from the range of the brightness adjustment level bins is determined based on the histogram.

16. The method of claim 15, wherein generating the histogram from the brightness adjustment levels includes weighting the histogram with an error function.

17. The method of claim 8, further comprising:
  generating a second image of pixels of the electronic display while second color sub-pixels of the pixels emit a second color light;
  determining second brightness adjustment levels for the second color sub-pixels based on the second image;
  determining a set of second adjustment quantization values for the second color sub-pixels based on the second brightness adjustment levels for the second color sub-pixels;
  generating a second texture defining, for each of the second color sub-pixels, a second adjustment quantization value from the set of second adjustment quantization values;
  generating a second compressed texture for correcting the second color sub-pixels of the electronic display by converting second adjustment quantization values of adjacent second color sub-pixels in the second texture into second compressed values; and
  storing the second compressed texture including the second compressed values in the memory.

18. The method of claim 17, wherein:
  the first color sub-pixels are red color sub-pixels;
  the second color sub-pixels are blue color sub-pixels;
  the pixels further include green color sub-pixels; and
  the memory excludes a compressed texture for correcting the green color sub-pixels of the electronic display.

19. A system for pixel correction, comprising:
  a camera configured to generate an image of pixels of an electronic display while first color sub-pixels of the pixels emit a first color light; and
  circuitry configured to:
    determine brightness adjustment levels for the first color sub-pixels based on the image;
    determine a set of adjustment quantization values for the first color sub-pixels based on fitting the brightness adjustment levels for the first color sub-pixels to a predefined number of values by:
      generating brightness adjustment level bins from the brightness adjustment levels for the first color sub-pixels;
      determining a range of the brightness adjustment level bins; and
      assigning a subset of the brightness adjustment level bins to the set of adjustment quantization values with each brightness adjustment level bin in the range of brightness adjustment level bins being assigned to an adjustment quantization value in the set of adjustment quantization values;

generate a texture defining, for each first color sub-pixel, an adjustment quantization value from the set of adjustment quantization values;

generate a compressed texture for correcting the first color sub-pixels of the electronic display by converting adjustment quantization values of adjacent first color sub-pixels in the texture into compressed values; and store the compressed texture including the compressed values in a memory.

20. The system of claim 19, wherein:

the adjacent first color sub-pixels include blocks of first color sub-pixels; and the circuitry configured to convert the adjustment quantization values of adjacent first color sub-pixels in the texture into the compressed values includes the circuitry being configured to apply a block compression to the adjustment quantization values.

* * * * *

UNITED STATES PATENT AND TRADEMARK OFFICE
CERTIFICATE OF CORRECTION

PATENT NO.         : 10,692,473 B1
APPLICATION NO.    : 15/920355
DATED              : June 23, 2020
INVENTOR(S)        : Matthew Robert Fulghum Page 1 of 1

It is certified that error appears in the above-identified patent and that said Letters Patent is hereby corrected as shown below:

In the Claims

Column 19, Line 62, In Claim 12, delete "between the between the" and insert --between the-- therefor
Column 20, Line 14, In Claim 15, after "wherein the", delete "from the"

Signed and Sealed this
Twenty-fourth Day of November, 2020

Andrei Iancu
*Director of the United States Patent and Trademark Office*